(12) United States Patent
Vaidya

(10) Patent No.: US 6,602,944 B2
(45) Date of Patent: Aug. 5, 2003

(54) PRESSURE SENSITIVE COHESIVE

(75) Inventor: Milind Vaidya, Grand Island, NY (US)

(73) Assignee: Moore North America, Inc., Grand Island, NY (US)

( * ) Notice: Subject to any disclaimer, the term of this patent is extended or adjusted under 35 U.S.C. 154(b) by 105 days.

(21) Appl. No.: 09/789,532

(22) Filed: Feb. 22, 2001

(65) Prior Publication Data

US 2001/0023738 A1 Sep. 27, 2001

Related U.S. Application Data

(63) Continuation-in-part of application No. 09/507,932, filed on Feb. 22, 2000, now Pat. No. 6,383,653.

(51) Int. Cl.[7] .............................. C08J 3/02; C08K 3/20; C08K 3/34; C08L 89/00; B31F 1/00
(52) U.S. Cl. ...................... 524/492; 156/226; 524/401; 524/442; 524/450; 524/457; 524/493; 524/500; 525/54.1; 525/242; 525/244; 525/254
(58) Field of Search .......................... 156/226; 524/401, 524/442, 450, 457, 492, 493, 500; 525/54.1, 242, 244, 254

(56) References Cited

U.S. PATENT DOCUMENTS

| | | |
|---|---|---|
| 4,107,109 A | 8/1978 | Kassal |
| 4,755,550 A | 7/1988 | Shuman et al. |
| 4,918,128 A | 4/1990 | Sakai |
| 5,143,972 A | 9/1992 | Groves |
| 5,190,818 A | 3/1993 | Sakai |
| 5,229,206 A | 7/1993 | Groves |
| 5,314,944 A | 5/1994 | Chao |
| 5,424,122 A | 6/1995 | Crandall et al. |
| 5,427,128 A | 6/1995 | Minkin |
| 5,427,851 A | 6/1995 | Mehta |

FOREIGN PATENT DOCUMENTS

| | | |
|---|---|---|
| EP | 0 349 216 A | 1/1990 |
| JP | 62-187777 | 8/1987 |
| JP | 1-168779 | 7/1989 |
| JP | 3-220279 | 9/1991 |

OTHER PUBLICATIONS

Ishikawa et al, "Poly–Polymerization of Methyl Methacrylate and Styrene with the Use of Natural Latex" Journal of Polymers, 31:12, 733–737 (1974).

Primary Examiner—Patrick D. Niland
(74) Attorney, Agent, or Firm—Nixon & Vanderhye, P.C.

(57) ABSTRACT

A pressure sensitive adhesive/cohesive exhibits excellent cohesive body properties, and other desirable features, even when exposed to heat and polysiloxane based lubricants, such as in a laser printer. The formulation comprises 100 parts by weight natural rubber (e.g. electrosterically stabilized natural rubber graft and block terpolymer), and expressed as percentages by weight of the rubber the following components: about 5–35% (e.g. about 28%) acrylate monomer or monomers (such as methyl methacrylate, cyclohexyl methacrylate, benzyl methacrylate, and/or isobornyl methacrylate); about 0.5–8% acrylic acid and/or about 1–10% 4-acetoxystyrene; about 0–20% ethyl hexyl acrylate; about 1–50% (e.g. about 10–30%) finely divided hard particulate material (such as silica gel); 0–50% (preferably about 10–30%) starch; and 0–40% (preferably at least about 5%) carboxylated styrene-butadiene latex, or carboxylated polychloroprene latex, or a styrene-acrylate-acrylonitrile latex, or vinyl-pyridine styrene-butadiene latex, or pre-crosslinked natural rubber latex, or a tackifier, or combinations thereof. The cohesive is coated onto paper and seals to like cohesive upon the application of a force of at least 100 lbs per lineal inch.

77 Claims, No Drawings

PRESSURE SENSITIVE COHESIVE

This application is continuation-in-part of application Ser. No. 09/507,932, filed Feb. 22, 2000, now U.S. Pat. No. 6,383,653.

BACKGROUND AND SUMMARY OF THE INVENTION

U.S. Pat. Nos. 4,918,128 and 5,190,818 provide pressure sensitive adhesives/cohesives that are revolutionary in their utility when utilized with mailers or like type documents or business forms. These patented adhesives have allowed the practical implementation in the mailer industry of mailers which may be quickly and effectively produced and sealed without the drawbacks associated with conventional heat or moisture activated adhesives.

While the adhesives in the above-identified patents are extremely effective, it is desirable to be able to produce an adhesive that has even better properties. While the adhesives in the above-identified patents are not tacky after the application to paper, and do not adhere/seal unless a high level of pressure is applied (which prevents the adhesive from blocking during the printing, which would slow down the processing due to paper jams or the like), sometimes the adhesive action may be hampered by contamination of the printing surface and adhesive with silicone lubricants used in conventional printers (particularly laser printers).

The adhesive according to the present invention, when coated on paper or like substrates used in mailer-type business forms, or the like, has the same advantageous properties as the adhesives in the above-identified patents and also has enhanced functionality when contaminated by silicone lubricants.

Like the preferred embodiments in the above-identified patents, the cohesive according to the present invention contains a natural rubber graft, an appropriate acrylate monomer or monomers such as methyl methacrylate, or cyclohexyl methacrylate, or benzyl methacrylate, or isobornyl methacrylate or trimethyl cyclohexyl methacrylate or isobornyl acrylate), and finely divided hard particles such as silica. When cyclohexyl methacrylate is employed it is typically present in an amount of about 0.5–1.5 weight %, more usually about 1 weight % based in the weight of the modified latex. Methyl methacrylate and polymethylmethacrylate when employed are typically present in an amount of about 10–18 weight %, more usually about 15 weight %.

The cohesive according to the present invention also may include starch, acrylic acid and/or 4-acetoxystyrene, and optionally ethyl hexyl acrylate.

According to the present invention a pressure sensitive adhesive/cohesive is provided comprising the following components: 100 parts by weight natural rubber; about 5–35%, by weight of the rubber, acrylate monomer; about 0.5–8% by weight of the rubber acrylic acid and/or about 0–10%, typically 1–10%, by weight of rubber, 4-acetoxystyrene, and 1–50%, by weight of the rubber, a finely divided hard particulate material having substantially no thermoplasticity.

The composition may also comprise advantageously about 0–10%, for example 1–10%, by weight of rubber, 4-acetoxystyrene. The composition may further comprise about 0–20%, by weight of the rubber, ethyl hexyl acrylate, 0–50%, by weight of the rubber, starch; and 0–40%, by weight of the rubber, carboxylated styrene-butadiene latex, or carboxylated polychloroprene latex, or vinyl-pyridine styrene-butadiene latex or pre-crosslinked natural rubber latex, or a tackifier, or combinations thereof.

In the case of 4-acetoxystyrene as a comonomer in the graft/block of the rubber, grafted rubber has built-in antioxidant as a result of hydrolysis of acetoxy group which provides the cohesive antioxidant property helping its shelf-life as a coated cohesive by acting as a free radical scavenger.

The pressure sensitive adhesive/cohesive according to the present invention is typically coated on a piece of paper. More typically, since the material according to the invention is best as a cohesive, it is coated on two portions of a piece of paper, the cohesive portions being in contact with each other as a result of folding the paper (such as by forming a mailer), or bringing a like sheet in contact therewith, and pressure sealed together (such as by running through conventional pressure sealing equipment, such as "Speedisealer®" equipment available from Moore USA of Lake Forest, Ill.), so as to cause paper fiber tear if attempted to be pulled apart.

In the following discussion, percentages are by weight unless otherwise stated. Preferably, the adhesive/cohesive comprises at least 1% ethyl hexyl acrylate, and at least 1% starch, e.g. about 10–30% starch (such as about 20% starch) having an average particle size of about 5–25 microns. The hard particulate material preferably comprises silica gel, e.g. about 10–30% (such as about 20%), the silica gel having an average particle size of about 0.2–20 microns (e.g. about 0.3–0.4 microns), or a fumed silica (e.g. 0.1–0.3 microns). There also may be at least 5% carboxylated styrene-butadiene latex, or carboxylated polychloroprene latex, or vinyl-pyridine styrene-butadiene latex, or pre-crosslinked natural rubber latex, or a styrene-acrylate-acrylonitrile latex, or a tackifier, or combinations thereof.

The acrylate monomer preferably comprises methyl methacrylate, e.g. about 5–30%, or 0.5–8% of 4-acetoxystyrene, cyclohexyl methacrylate, benzyl methacrylate, trimethyl cyclohexyl methacrylate or isobornyl methacrylate. The acrylic acid typically is present between about 0.5–4%, and the 4-acetoxystyrene between about 1–3%. The modified natural rubber latex is preferably electrosterically stabilized natural rubber graft and block terpolymer.

Generally, the acrylate monomer is selected from cyclohexyl methyl methacrylate, methyl methacryate and mixtures of the two. Trimethyl cyclohexyl methyl methacrylate, methyl methacryate and mixtures thereof may also be used. In both instances, the natural rubber may be electrostatically stabilized latex of natural rubber graft/block terpolymer.

In the present case, the term "electrosterically" is used when there are ionizable/hydrolyzable groups grafted onto the natural rubber, e.g. acrylic acid or 4-acetoxystyrene. These ionizable groups impart a negative charge to the latex particles which stabilizes the emulsion. The term "electrostatically" is used when non-ionizable/hydrolyzable groups grafted onto the natural rubber and, hence, the only charge on the latex particles arises from an electric double layer.

According to a further embodiment, the cohesive may be manufactured by synthesizing a modified natural rubber latex through reaction of 1,4 cis polyisoprene (natural rubber) with two or more acrylate monomers, followed by further reactions and processing. Typically, the modification carried out using cyclohexyl methacrylate (CHMA) (approx. 1 to about 5% by weight) and/or methyl methacrylate (MMA) (approx. 10–18% by weight).

For purposes of discussion, the synthesis of the modified natural rubber latex graft/block terpolymer with CHMA/

MMA will be described below. However, it will understood that the invention is not limited to modified natural rubber latexes using those two acrylate monomers. Examples of other acrylates which may be used are benzyl methacrylate and/or isobornyl methacrylate and/or trimethyl cyclohexyl methacrylate and/or isobornyl acrylate.

A graft/block terpolymer of natural rubber latex with CHMA/MMA may be synthesized by conducting a seeded emulsion polymerization of natural rubber latex (for example about 100 parts by weight) with CHMA (for example about 5 parts by weight), by initiating a graft polymerization by a redox couple under a nitrogen atmosphere in a reaction vessel at 35° C. After CHMA starts to polymerize and starts to be consumed, MMA (about 11 parts by weight) is added to the reaction mixture by initiating a reaction with the redox couple initiator system. MMA polymerizes along with the growing polymer CHMA chains creating partial blocks of poly CHMA poly MMA grafted onto the 1,4-cis-polyisoprene.

This results in a modified natural rubber latex molecular architecture which is a graft/block terpolymer latex. Some polymethylmethacrylate (PMMA) is also formed during synthesis of the modified natural rubber latex because surfactant concentration is far above the cmc (critical micelle concentration) which promotes the formation of some emulsion polymerized MMA in the micelles. This is about 0.2%–0.5 wt % emulsion polymerized PMMA in the modified natural rubber colloid. Reaction of MMA and/or CHMA is believed to be accompanied by some chemical crosslinking to form a graft block terpolymer of 1,4 cis polyisoprene (natural rubber) with CHMA and PMMA.

The modified natural rubber latex is then blended with a styrene-butyl acrylate latex, typically Acrygen 41135 latex having a narrow particle size distribution (average particle size 400 nm), a surface tension of 49 dyne/cm, and a Brookfield viscosity (#2 @6 rpm) of 1500 cps. Acrygen 41135 latex possesses excellent mechanical stability, tensile strength 510 psi, and elongation of 700%, and is compatible with the modified natural rubber latex, functions as binder, has mechanical stability and acts as a colloidal stability enhancer. Chemical crosslinking between Acrygen 41135 and the modified natural rubber latex is not believed to occur.

A sulfated fatty acid, typically Modical S, is then added to the formulation as a mechanical and chemical stability enhancer. This is followed by blending the mixture to form a colloidally stable cohesive formulation.

Styrene present in the cohesive is from the Acrygen 41135 latex which is a alternating copolymer latex of styrene and butyl acrylate with a narrow particle size distribution. Styrene is not a part of the modified natural rubber latex employed as starting material.

In a yet further embodiment, the cohesive of the invention may be synthesized as follows.

Modified latex (a graft block terpolymer of 1,4 cis polyisoprene (natural rubber-synthesized as described above) is blended with Acrygen 41135 latex (Omnova Solutions) in a blender. Modical S (Henkel corporation), a sulfated fatty acid, is added to the formulation as a mechanical and chemical stability enhancer, followed by blending of all of the components to form a colloidally stable mixture. A silica hydrogel slurry, typically Syloid W-300 (Grace-Davison corporation), is added to the colloidal mixture and stirred. Syloid W-300 has an average particle size of 5 $\mu$m and a pore volume of 1.2 cc/gm. The silica hydrogel also modifies the modulus of the cohesive composite and helps to absorb the silicone lubricant.

An acetylenic diol nonionic surfactant with a mid HLB (hydrophilic lypophilic balance) range=+13, typically Surfynol GA (Air Products and Chemicals), is added to the colloidal mixture and the mixture is stirred. The Surfynol GA functions as a pigment disperser and helps the colloidal stability of the formulation.

A silicone based defoamer, for example SN-381 (San Nopco) is added to the mixture and the mixture is stirred. This is followed by addition of a sodium polyacrylate thickener with a very high pseudoplastic index, typically Alocgum 296W (Alco Chemical), and the mixture is stirred until the thickener is dispersed. An ammoniacal solution of yellow dye, typically FDC No.5 (B.F. Goodrich - trisodium salt of 4,5-dihydro-5-oxo-1 (4-sulfophenyl)-4-[4-sulfophenylazo]-1H-pyrrazole-3-carboxylic acid) is added and the mixture is stirred.

An antimicrobial agent, typically Dowisil 75, active ingredient 1-(3-chloroallyl)-3,5,7-triazaadamantane chloride (Dow Chemical), is then added to the formulation and the mixture is stirred, followed by addition of an antioxidant, typically Tinox # 22MB - 2,2'-methylene bis (4-methyl-6-tert-butyl-phenol (Technical Solutions Inc.) in aqueous dispersion, to the colloidal mixture and the mixture is stirred. This antioxidant controls high shear mechanical degradation of polymer chains of the modified natural rubber latex (graft block terpolymer of 1,4 cis polyisoprene (natural rubber) with CHMA and PMMA), which occurs when the formulation is applied under high shear on the coating press. The antioxidant also helps to prevent the crosslinking of the modified natural rubber latex.

According to another aspect of the present invention, a method of making a mailer type business form is provided. The method comprises: (a) applying cohesive as cooperating patterns to a sheet of paper so that when the sheet is folded, or brought into contact with a like sheet, the patterns move into contact with each other. The cohesive comprises a pressure sensitive cohesive including: 100 parts by weight natural rubber; about 5–35% by weight of the rubber acrylate monomer; about 0–8% (preferably about 0.5–8%) by weight of the rubber acrylic acid and/or about 0–10% (preferably about 1–10%) by weight 4-acetoxystyrene; about 0–20% by weight of the rubber ethyl hexyl acrylate; 1–50% by weight of the rubber a finely divided hard particulate material having substantially no thermoplasticity; 0–50% by weight of the rubber starch; and 0–40% by weight of the rubber carboxylated styrene-butadiene latex, styrene-acrylate-acrylonitrile latex, or carboxylated polychloroprene latex, or vinyl-pyridine styrene-butadiene latex, or pre-crosslinked natural rubber latex, or a tackifier, or combinations thereof. When the film is formed on the surface paper, there is a compatibilizing effect between the Acrygen 41135 a styrene-acrylate latex which helps to change the surface characteristics of the film. Acrygen 41135 has a glass transition temperature (Tg) of 15° C.

The method may comprise the further steps of: (b) folding the paper to move the cohesive patterns into contact with each other, and (c) applying a sealing pressure of at least about 100 lbs/lineal inch (e.g. about 200 lbs/lineal inch) to the patterns to seal the cohesive together so as to cause fiber tear if attempted to be pulled apart.

The present invention provides a pressure sensitive cohesive/adhesive which exhibits excellent adhesive bonding, cohesive bonding, resistance to heat, blocking resistance, resistance to abrasion, non-tackiness, good creep properties, and substantially no loss in adhesion/cohesion upon exposure to heat and polysiloxane based lubricants.

Further aspects of the invention will become clear from an inspection of the detailed description of the invention and from the appended claims.

DETAILED DESCRIPTION OF THE INVENTION

The general invention as described above will now be set forth with respect to some specific examples.

EXAMPLE 1

Electrosterically stabilized latex of natural rubber graft and block terpolymer with about 1.5% by weight of acrylic acid and about 28.5% by weight of methyl methacrylate and 0% by weight of ethyl hexyl acrylate, were admixed with fumed/or precipitated silicon dioxide (silica gel) with an average aggregate particle size of from about 0.2 $\mu$m to 0.6 $\mu$m in an amount about 20% by weight and a starch, with a specified range of about 10 $\mu$m average particle diameter in an amount of about 14.5 weight % per 100 parts by weight of modified electrosterically stabilized natural rubber, to prepare a pressure sensitive adhesive/cohesive. The terpolymer latex in this example is referred to as latex 1, and the formulation preparation in this example will be referred to as cohesive 1.

EXAMPLE 2

Electrosterically stabilized latex of natural rubber graft and block terpolymer with 3% by weight of acrylic acid and about 28% by weight of methyl methacrylate and 0% by weight of ethyl hexyl acrylate were admixed with fumed/or precipitated silicon dioxide (silica gel) with an average particle diameter of about 0.4 $\mu$m in an amount of about 20% by weight and a starch, with a specified range of about 10 $\mu$m average particle diameter in an amount of about 14.5 weight % per 100 parts by weight of modified electrosterically stabilized natural rubber to prepare a pressure sensitive adhesive/cohesive. The terpolymer latex in this Example 2 is referred to as latex 2, and the formulation preparation in this example will be referred to as cohesive 2.

EXAMPLE 3

The cohesives of Examples 1 and 2, namely cohesive I and II, were coated on 20 pound paper using a No. 4 Meyer rod.

EXAMPLE 4

Electrosterically stabilized latex of natural rubber graft and block terpolymer with about 1.5% by weight of acrylic acid and about 23% by weight of methyl methacrylate and 0% by weight of ethyl hexyl acrylate were admixed with fumed/or precipitated silicon dioxide (silica gel) with an average particle diameter of about 0.3 ~0.4 $\mu$m in an amount of about 20% by weight per 100 parts by weight of modified electrosterically stabilized natural rubber to prepare a pressure sensitive adhesive/cohesive. The terpolymer latex in this example is referred to as latex 4, and the formulation preparation in this example will be referred to as cohesive 4.

EXAMPLE 5

Electrosterically stabilized latex of natural rubber graft and block terpolymer with about 1.5% by weight of acrylic acid and about 20% by weight of methyl methacrylate and 0% by weight of ethyl hexyl acrylate were admixed with fumed/or precipitated silicon dioxide (silica gel) with an average particle diameter of about 0.3 ~0.4 $\mu$m in an amount of about 20% by weight per 100 parts by weight of modified electrosterically stabilized natural rubber to prepare a pressure sensitive adhesive/cohesive. The terpolymer latex in this example is referred to as a latex 5, and the formulation preparation in this example will be referred to as cohesive 5.

EXAMPLE 6

Electrosterically stabilized latex of rubber graft and block terpolymer with about 1.5% by weight of acrylic acid and about 16% by weight of methyl methacrylate and 0% by weight of ethyl hexyl acrylate were admixed with fumed/or precipitated silicon dioxide (silica gel) with an average particle diameter of about 0.3 ~0.4 $\mu$m in an amount of about 20% by weight per 100 parts by weight of modified electrosterically stabilized natural rubber to prepare a pressure sensitive adhesive/cohesive. The terpolymer latex in this example is referred to as latex 6, and the formulation preparation in this example will be referred to as cohesive 6.

EXAMPLE 7

Electrosterically stabilized latex of natural rubber graft and block terpolymer with about 2.5% by weight of acrylic acid and about 15% by weight of methyl methacrylate and 0% by weight of ethyl hexyl acrylate were admixed with fumed/or precipitated silicon dioxide (silica gel) with an average particle diameter of about 0.3 ~0.4 $\mu$m in an amount of about 20% by weight per 100 parts by weight of modified electrosterically stabilized natural rubber, to prepare a pressure sensitive adhesive/cohesive. The terpolymer latex in this example is referred to as latex 7, and the formulation preparation in this example will be referred to cohesive 7.

EXAMPLE 8

Electrosterically stabilized latex of natural rubber graft and block terpolymer with about 3% by weight of 4-acetoxystyrene and about 15% by weight of methyl methacrylate and 0% by weight of acrylic acid were admixed with fumed/or precipitated silicon dioxide (silica gel) with an average particle diameter of about 0.3 ~0.4 $\mu$m in an amount of about 20% by weight per 100 parts by weight of modified electrosterically stabilized natural rubber, to prepare a pressure sensitive adhesive/cohesive. 4-acetoxystyrene rubber has a built-in antioxidant in the polymer chain helping the polymer against oxidation. The terpolymer latex in this example is referred to as latex 8, and the formulation preparation in this example will be referred to as cohesive 8.

EXAMPLE 9

Electrosterically stabilized latex of natural rubber graft and block terpolymer with about 1.5% by weight of 4-acetoxystyrene and about 15% by weight of methyl methacrylate and 0% by weight of acrylic acid were admixed with fumed/or precipitated silicon dioxide (silica gel) with an average particle diameter of about 0.3 ~0.4 $\mu$m in an amount of about 20% by weight per 100 parts by weight of modified electrosterically stabilized natural rubber, to prepare a pressure sensitive adhesive/cohesive. 4-acetoxystyrene rubber has a built-in antioxidant in the polymer chain helping the polymer against oxidation. The terpolymer latex in this example is referred to as latex 9, and the formulation preparation in this example will be referred to as cohesive 9.

EXAMPLE 10

Commercially available cohesive (TN-124) referred to as cohesive 10.

EXAMPLE 11

Commercially available cohesive (TN-124F) referred to as cohesive 11.

EXAMPLE 12

Electrostatically stabilized latex of natural rubber graft and block terpolymer with 4% by weight of cyclohexyl methacrylate and about 12% by weight of methyl methacrylate and 0% by weight of acrylic acid were admixed with fumed/or precipitated silicon dioxide/or silica gel with an average particle diameter of about 0.3~0.4 µm in amount of about 20% by weight per 100 parts by weight of modified electrostatically stabilized natural rubber, to prepare a pressure sensitive adhesive/cohesive. The terpolymer latex in this example is referred to as latex 12, and the formulation preparation in this example is referred to as cohesive 12.

EXAMPLE 13

Electrostatically stabilized latex of natural rubber graft/block terpolymer with 5% by weight of cyclohexyl methacrylate and about 11% by weight of methyl methacrylate and 0% by weight of acrylic acid were admixed with silica hydrogel with a average particle size of about 4~5 µm in amount of about 42% by weight per 100 parts by weight of modified electrostatically stabilized natural rubber latex, to prepare a pressure sensitive adhesive/cohesive. The terpolymer latex in this example is referred to as latex 13 and the formulation preparation in this example is referred to as cohesive 13.

EXAMPLE 14

Electrostatically stabilized latex of natural rubber graft/block terpolymer with 5% by weight of cyclohexyl methacrylate and about 11% by weight of methyl methacrylate and 0% by weight of acrylic acid were admixed with silica gel with a average particle size of about 4~5 µm and pore volume 1.2 cc/g in amount of about 20% by weight per 100 parts by weight of modified electrostatically stabilized natural rubber latex, to prepare a pressure sensitive adhesive/cohesive. The terpolymer latex in this example is referred to as latex 14 and the formulation preparation in this example is referred to as cohesive 14.

EXAMPLE 15

Electrostatically stabilized latex of natural rubber graft/block terpolymer with 5% by weight of tri-methyl-cyclohexyl methacrylate and about 11% by weight of methyl methacrylate and 0% by weight of acrylic acid were admixed with silica hydrogel with a average particle size of about 4~5 µm in amount of about 42% by weight per 100 parts by weight of modified electrostatically stabilized natural rubber latex, to prepare a pressure sensitive adhesive/cohesive. The terpolymer latex in this example is referred to as latex 15 and the formulation preparation in this example is referred to as cohesive 15.

EXAMPLE 16

Electrostatically stabilized latex of natural rubber graft/block terpolymer with 2% by weight of cyclohexyl methacrylate and about 12% by weight of methyl methacrylate and 0% by weight of acrylic acid were admixed with silica hydrogel with a average particle size of about 4~5 µm in amount of about 42% by weight per 100 parts by weight of modified electrostatically stabilized natural rubber latex, to prepare a pressure sensitive adhesive/cohesive. The terpolymer latex in this example is referred to as latex 16 and the formulation preparation in this example is referred to as cohesive 16.

EXAMPLE 17

Electrostatically stabilized latex of natural rubber graft/block terpolymer with 5% by weight of tri-methyl-cyclohexyl methacrylate and about 11% by weight of methyl methacrylate and 0% by weight of acrylic acid were admixed with silica gel with a average particle size of about 4~5 µm and pore volume 1.2 cc/g in amount of about 20% by weight per 100 parts by weight of modified electrostatically stabilized natural rubber latex, to prepare a pressure sensitive adhesive/cohesive. The terpolymer latex in this example is referred to as latex 17 and the formulation preparation in this example is referred to as cohesive 17.

EXAMPLE 18

Electrostatically stabilized latex of natural rubber graft/block terpolymer with 2% by weight of cyclohexyl methacrylate and about 12% by weight of methyl methacrylate and 0% by weight of acrylic acid were admixed with silica gel with a average particle size of about 4~5 µm and pore volume 1.2 cc/g in amount of about 20% by weight per 100 parts by weight of modified electrostatically stabilized natural rubber latex, to prepare a pressure sensitive adhesive/cohesive. The terpolymer latex in this example is referred to as latex 18 and the formulation preparation in this example is referred to as cohesive 18.

EXAMPLE 19

| FORMULATIONS OF COHESIVES I, II, III, IV, V, VI, VII, VIII, IX, XII–XVIII | | |
|---|---|---|
| INGREDIENTS | SUPPLIER | PHR |
| Latex 1 or 2 or 4 or 5 or 6 or 7 or 8 or 9 or 12 | Moore | 100 |
| Silica Cabotex A-2095 | Cabot | 20.1 |
| Wheat Starch | ADM | 14.5 |
| Surfactant Surfynol GA | Air Products | 1.72 |
| Thickener Cellusize | Union Carbide | 1.08 |
| Antiseptic Nalco 7635 | Nalco | 0.49 |
| Defoamer SN-381 | San Nopco | 0.74 |
| Total | | 138.56 |

Application and Testing

The resulting formulations Cohesives I, II, IV, V, VI, VII, VIII, IX and XII–XVIII were applied to 24 pound paper to form a film by an applicator no. 4 Meyer rod and dried in an oven to form a thin film about 7~9 µm thick for a 24 pound paper (12 samples each).

Two of the samples were sealed with PS-4 Speedisealer®) equipment available from Moore North America, Inc., Lake Forest, Ill., with 200 PLI pressure without exposure to the imaging environment. Two minutes after the samples were sealed, the samples were peeled. All samples sealed properly and showed a fiber tear and also it was observed that dried samples were not at all tacky.

Out of remaining 10 samples, 5 samples were run through a Xerox 4050 Laser printer and 5 samples were run through a Xerox 4635 printer in order to expose the cohesive film to heat and silicone lubricants. After waiting for 2 minutes, all 10 samples were sealed with a PS-4 Speedisealer® equipment with 200 PLI pressure. Two minutes after the samples were sealed, the samples were peeled to examine the sealing quality and also it was observed that dried samples were not at all tacky. Also after running through the Xerox 4050 and Xerox 4635 printers, the samples showed no sign of blocking, or jamming in the Xerox printers.

Along with the above mentioned samples, for comparison 12 samples each with TN-124 and TN-124F (commercially available) were prepared by coating with an applicator no. 4 Meyer rod and dried in an oven to form a thin film of about 7~9 μm thickness for 24 pound paper. Two minutes after the samples were sealed, the samples were peeled to examine the sealing quality and also it was observed that dried samples were not at all tacky.

All the testing data is summarized in Table I.

-continued

| INGREDIENTS | SUPPLIER | PHR |
|---|---|---|
| Modicol S | Henkel | 0.5 |
| Surfynol GA | Air Products | 1.6 |
| Syloid W-300 | Grace Davison | 42 |
| Alcogum 296-W | Alco Chemical | 1.1 |
| Defoamer SN-381 | San Nopco | 0.5 |
| Yellow Dye FDC#5 | B. F. Goodrich | 0.12 |
| Dowisil 75 | Dow Chemical | 0.34 |
| Tinox # 22MB | Technical Solutions Inc. | 0.9 |
| Total | | 147.06 |

| | THICKNESS μm | SEALING WITHOUT SILICONE LUBRICANT | SEALING AFTER IMAGING THROUGH XEROX 4050 2 MIN DELAY | SEALING AFTER IMAGING THROUGH XEROX 4635 2 MIN DELAY | BLOCKING IN THE LASER PRINTER | RUBBING TEST |
|---|---|---|---|---|---|---|
| Cohesive 1 | 7~9 μm | Very strong, fiber tear | Very strong, fiber tear | poor | No | pass |
| Cohesive 2 | 7~9 μm | Very strong, fiber tear | Very strong, fiber tear | poor | No | pass |
| Cohesive 3 | 7~9 μm | Very strong, fiber tear | Very strong, fiber tear | poor | No | pass |
| Cohesive 4 | 7~9 μm | Very strong, fiber tear | Very strong, fiber tear | fair | No | pass |
| Cohesive 5 | 7~9 μm | Very strong, fiber tear | Very strong, fiber tear | fair | No | pass |
| Cohesive 6 | 7~9 μm | Very strong, fiber tear | Very strong, fiber tear | Very strong, fiber tear | No | pass |
| Cohesive 7 | 7~9 μm | Very strong, fiber tear | Very strong, fiber tear | Very strong, fiber tear | No | pass |
| Cohesive 8 | 7~9 μm | Very strong, fiber tear | Very strong, fiber tear | Very strong, fiber tear | No | pass |
| Cohesive 9 | 7~9 μm | Very strong, fiber tear | Very strong, fiber tear | Very strong, fiber tear | No | pass |
| Cohesive 10 | 7~9 μm | Very strong, fiber tear | Good, fiber tear | poor | No | pass |
| Cohesive 11 | 7~9 μm | Very strong, fiber tear | Very strong, fiber tear | Very strong, fiber tear | No | pass |
| Cohesive 12 | 7~9 μm | Very strong, fiber tear | Very strong, fiber tear | Very strong, fiber tear | No | pass |
| Cohesive 13 | 7~9 μm | Very strong, fiber tear | Very strong, fiber tear | Very strong, fiber tear | No | pass |
| Cohesive 14 | 7~9 μm | Very strong, fiber tear | Very strong, fiber tear | Very strong, fiber tear | No | pass |
| Cohesive 15 | 7~9 μm | Very strong, fiber tear | Very strong, fiber tear | Very strong, fiber tear | No | pass |
| Cohesive 16 | 7~9 μm | Very strong, fiber tear | Good, fiber tear | poor | No | pass |
| Cohesive 17 | 7~9 μm | Very strong, fiber tear | Very strong, fiber tear | Very strong, fiber tear | No | pass |
| Cohesive 18 | 7~9 μm | Very strong, fiber tear | Very strong, fiber tear | Very strong, fiber tear | No | pass |

Formulation of cohesives 13, 15 and 16

| INGREDIENTS | SUPPLIER | PHR |
|---|---|---|
| Modified LATEX | Moore | 85 |
| Acrygen 41135 | Omnova Solutions | 15 |

Formulation of cohesives 14, 17 and 18

| INGREDIENTS | SUPPLIER | Wt % |
|---|---|---|
| Modified LATEX | Moore | 85 |
| Acrygen 41135 | Omnova Solutions | 15 |

-continued

| INGREDIENTS | SUPPLIER | Wt % |
|---|---|---|
| Modicol S | Henkel | 0.5 |
| Surfynol GA | Air Products | 1.6 |
| Gasil IJ-35 | Crossfield Company | 20 |
| Alcogum 296-W | Alco Chemical | 1.1 |
| Defoamer SN-381 | San Nopco | 0.5 |
| Yellow Dye FDC#5 | B. F. Goodrich | 0.12 |
| Dowisil 75 | Dow Chemical | 0.34 |
| Tinox # 22MB | Technical Solutions Inc. | 0.9 |
| Total | | 125.06 |

If used, the carboxylated styrene-butadiene latex may be from Ameripol-Synpol, and/or the carboxylated polychloroprene latex from Butachlor XL 415 from Enichem Elastomers America, and/or the vinyl-pyridine styrene-butadiene latex from Pliocord Vp-5622 from Goodyear and/or styrene-acrylate-acrylate latex from OMNOVA Inc. The details of the acrylic acid, ethyl hexyl acrylate, cyclohexyl methacrylate, benzyl methacrylate, isobornyl methacrylate, 4-acetoxystyrene, the range of percentage for the various components, and the average particle diameter for the starch and finely divided hard particulate material having substantially no thermal plasticity (preferably silica gel), are as described above in the Background and Summary of the Invention. Other modifications are also possible, including coatings on other types of paper besides 20 lb. and 24 lb., and 28 lb. and mailers of all different types may be made, including V-fold, Z-fold, and C-fold, as are conventional, or sheets of paper mated face-to-face. Other types of sealing equipment, as well as conventional folding equipment, can be utilized, in the practice of the method of the invention, and in the production of business forms pursuant to the invention. Also, other types of products can be produced aside from mailer type business forms. The documents/sheets of paper may be preprinted before being fed to a laser (or like) printer or the like, the laser printer imprinting variable and/or non-variable indicia thereon, by applying toner.

The invention also specifically includes all narrower ranges within a broad range. For example 1–10% means 2–9%, 1.9–3%, 6–9.5%, and all other narrower ranges within the broad range.

It will thus be seen that according to the present invention a highly advantageous pressure sensitive adhesive/cohesive, mailer-type business forms and/or pieces of paper coated thereby, have been provided as well as a method of making mailer-type business forms. While the invention has been herein shown and described in what is presently conceived to be the most practical and preferred embodiment thereof, many modifications may be made within the scope of the invention, which scope is to be accorded the broadest interpretation of the appended claims so as to encompass all equivalent products, formulations, and methods.

What is claimed is:

1. A pressure sensitive adhesive/cohesive comprising:
    a modified rubber latex synthesized by at least reacting 100 parts by weight natural rubber with at least one acrylate monomer at about 5–35% by weight of the natural rubber; and
    a finely divided hard particulate material, having substantially no thermoplasticity, at about 1–50% by weight of the natural rubber.

2. A pressure sensitive adhesive/cohesive as recited in claim 1 further comprising acrylic acid at about 0–8% by weight of the natural rubber.

3. A pressure sensitive adhesive/cohesive as recited in claim 1 further comprising 4-acetoxystyrene at about 0–10% by weight of the natural rubber.

4. A pressure sensitive adhesive/cohesive as recited in claim 1 further comprising 4-acetoxystyrene at about 1–10% by weight of the natural rubber.

5. A pressure sensitive adhesive/cohesive as recited in claim 1 further comprising ethyl hexyl acrylate at about 0–20% by weight of the natural rubber.

6. A pressure sensitive adhesive/cohesive as recited in claim 1 further comprising starch at about 0–50% by weight of the natural rubber.

7. A pressure sensitive adhesive/cohesive as recited in claim 1 further comprising carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof at 0–40% by weight of the natural rubber.

8. A pressure sensitive adhesive/cohesive as recited in claim 1 wherein the modified rubber latex is electrosterically stabilized latex of natural rubber graft and block terpolymer.

9. A pressure sensitive adhesive/cohesive as recited in claim 1 wherein the acrylate monomer is selected from the group consisting of methyl methacrylate, cyclohexyl methacrylate, benzyl methacrylate, trimethyl cyclohexyl methacrylate, isobornyl acrylate and isobornyl methacrylate.

10. A pressure sensitive adhesive/cohesive as recited in claim 1, wherein the monomer is cyclohexyl methacrylate and is present in an amount of about 1 wt % based on the weight of the natural rubber.

11. A pressure sensitive adhesive/cohesive as recited in claim 1, wherein the monomer is methyl methacrylate and is present in an amount of about 12 wt % based on the weight of the natural rubber.

12. A pressure sensitive adhesive/cohesive as recited in claim 1 wherein the adhesive/cohesive is coated on a piece of paper.

13. A pressure sensitive adhesive/cohesive as recited in claim 12 coated on two portions of a piece of paper, said cohesive portions in contact with each other as a result of folding the paper, and pressure sealed together, so as to cause paper fiber tear if attempted to be pulled apart.

14. A pressure sensitive adhesive/cohesive as recited in claim 1 further comprising a built-in antioxidant in the modified rubber latex, which gives an oxidative stability to the pressure sensitive adhesive/cohesive.

15. A pressure sensitive adhesive/cohesive as recited in claim 1 further comprising ethyl hexyl acrylate which is at least 1% by weight of the natural rubber.

16. A pressure sensitive adhesive/cohesive as recited in claim 1 further comprising starch which is at least 1% by weight of the natural rubber, and wherein the modified rubber latex is an electrosterically stabilized latex of natural rubber graft and block terpolymer.

17. A pressure sensitive adhesive/cohesive as recited in claim 1 further comprising starch having an average particle size of about 5–25 microns at about 10–30% by weight of the natural rubber.

18. A pressure sensitive adhesive/cohesive as recited in claim 17 wherein the hard particulate material comprises silica gel having an average particle size of about 0.1–20 microns at about 10–30% by weight of the natural rubber.

19. A pressure sensitive adhesive/cohesive as recited in claim 1 further comprising carboxylated styrene-butadiene latex, or carboxylated polychloroprene latex, or vinyl-pyridine styrene-butadiene latex, or pre-crosslinked natural rubber latex, or a styrene-acrylate-acrylonitrile latex, or a tackifier, or combinations thereof which is at least 5% by weight of the natural rubber.

20. A pressure sensitive adhesive/cohesive as recited in claim 1 further comprising acrylic acid at about 1.5–4% by weight of the natural rubber, and wherein the acrylate monomer comprises methyl methacrylate at about 15–35% by weight of the natural rubber.

21. A pressure sensitive adhesive/cohesive as recited in claim 20 wherein the acrylate monomer comprises cyclohexyl methacrylate and methyl methacrylate.

22. A pressure sensitive adhesive/cohesive as recited in claim 13 further comprising starch which is at least 1% by weight of the natural rubber, and wherein the modified rubber latex is an electrosterically stabilized latex of natural rubber graft and block terpolymer.

23. A pressure sensitive adhesive/cohesive as recited in claim 13 further comprising starch having an average particle size of about 5–25 microns at about 10–30% by weight of the natural rubber.

24. A pressure sensitive adhesive/cohesive as recited in claim 13 wherein the hard particulate material comprises silica gel having an average particle size of about 0.3–0.4 microns at about 10–30% by weight of the natural rubber.

25. A pressure sensitive adhesive/cohesive as recited in claim 13 further comprising carboxylated styrene-butadiene latex, or carboxylated polychloroprene latex, or vinyl-pyridine styrene-butadiene latex, or pre-crosslinked natural rubber latex, or a styrene-acrylate-acrylonitrile latex, or a tackifier, or combinations thereof which is at least 5% by weight of the natural rubber.

26. A pressure sensitive adhesive/cohesive as recited in claim 13 further comprising acrylic acid at about 1.5–4% by weight of the natural rubber, and wherein the acrylate monomer comprises methyl methacrylate at about 5–30% by weight of the natural rubber.

27. A pressure sensitive adhesive/cohesive as recited in claim 8 further comprising starch which is at least 1% by weight of the natural rubber.

28. A pressure sensitive adhesive/cohesive as recited in claim 27 further comprising ethyl hexyl acrylate which is at least 1% by weight of the natural rubber, and wherein the modified rubber latex is an electrosterically stabilized latex of natural rubber graft and block terpolymer.

29. A pressure sensitive adhesive/cohesive as recited in claim 26 comprising carboxylated styrene-butadiene latex, or carboxylated polychloroprene latex, or vinyl-pyridine styrene-butadiene latex, or pre-crosslinked natural rubber latex, or a styrene-acrylate-acrylonitrile latex, or a tackifier, or combinations thereof which is at least 5% by weight of the natural rubber.

30. A pressure sensitive adhesive/cohesive as recited in claim 1 wherein the acrylate monomer is selected from the group consisting of cyclohexyl methyl methacrylate and methyl methacryate.

31. A pressure sensitive adhesive/cohesive as recited in claim 1 wherein the acrylate monomer is selected from the group consisting of trimethyl cyclohexyl methyl methacrylate and methyl methacryate.

32. A pressure sensitive adhesive/cohesive as recited in claim 30 wherein the modified rubber latex is an electrostatically stabilized latex of natural rubber graft/block terpolymer.

33. A pressure sensitive adhesive/cohesive as recited in claim 31 wherein the modified rubber latex is an electrostatically stabilized latex of natural rubber graft/block terpolymer.

34. A method of making a mailer type business form, comprising:
(a) applying cohesive as cooperating patterns to a sheet of paper so that when the sheet is folded or moved into contact with a like coated sheet, the patterns move into contact with each other, the cohesive comprising a pressure sensitive cohesive including: 100 parts by weight natural rubber; at least one acrylate monomer at about 5–35% by weight of the natural rubber; acrylic acid 0.5–8% by weight of the natural rubber and/or 4-acetoxystyrene at about 1–10% by weight of the natural rubber; ethyl hexyl acrylate at about 0–20% by weight of the natural rubber; a finely divided hard particulate material having substantially no thermoplasticity at 0–50% by weight of the natural rubber; starch at 0–50% by weight of the natural rubber; and carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof at 0–40% by weight of the natural rubber.

35. A method as recited in claim 34 further comprising: (b) folding the paper to move the cohesive patterns into contact with each other, and (c) applying a sealing pressure of at least about 100 lbs/lineal inch to the patterns to seal the cohesive together so as to cause fiber tear if attempted to be pulled apart.

36. A mailer type business form made by the method of claim 35.

37. A mailer type business form on which pressure sensitive adhesive/cohesive is applied, said pressure sensitive adhesive/cohesive comprising:
a modified rubber latex synthesized by reacting 100 parts by weight natural rubber with at least one acrylate monomer and acrylic acid; and
a finely divided hard particulate material, having substantially no thermoplasticity, at about 1–50% by weight of the natural rubber;
wherein said at least one acrylate monomer is about 5–35% by weight of the natural rubber.

38. A mailer type business form as recited in claim 37 wherein the modified rubber latex is an electrosterically stabilized latex of natural rubber graft and block terpolymer.

39. A mailer type business form as recited in claim 37 wherein the acrylate monomer is selected from the group consisting of methyl methacrylate, cyclohexyl methacrylate, benzyl methacrylate, trimethyl cyclohexyl methacrylate, isobornyl acrylate, isobornyl methacrylate, and combinations thereof.

40. A mailer type business form as recited in claim 37 wherein the acrylate monomer comprises methyl methacrylate.

41. A mailer type business form as recited in claim 37 wherein the acrylate monomer comprises methyl methacrylate at about 5–30% by weight of the natural rubber and wherein said acrylic acid is about 0.5–8% by weight of the natural rubber.

42. A mailer type business form as recited in claim 40 wherein the methyl methacrylate is about 10–20% by weight of the natural rubber.

43. A mailer type business form as recited in claim 42 wherein the natural rubber is electrosterically stabilized as a natural rubber graft and block terpolymer, and wherein the adhesive/cohesive is coated on the business type mailer.

44. A mailer type business form as recited in claim 37 further comprising about 1–50% starch by weight of the natural rubber.

45. A mailer type business form as recited in claim 37 further comprising carboxylated styrene-butadiene latex, or carboxylated polychloroprene latex, or vinyl-pyridine styrene-butadiene latex, or styrene-acrylate-acrylonitrile latex, or pro-crosslinked natural rubber latex, or a tackifier, or combinations thereof at about 1–40% by weight of the natural rubber.

46. A mailer type business form on which pressure sensitive adhesive/cohesive is applied, said pressure sensitive adhesive/cohesive comprising:
a modified rubber latex synthesized by reacting 100 parts by weight natural rubber with at least one acrylate monomer and 4-acetoxystyrene; and
a finely divided hard particulate material, having substantially no thermoplasticity, at about 1–50% by weight of the natural rubber;
wherein said at least one acrylate monomer is about 5–35% by weight of the natural rubber.

47. A mailer type business form as recited in claim 46 wherein the modified rubber latex is an electrosterically stabilized latex of natural rubber graft and block terpolymer.

48. A mailer type business form as recited in claim 46 wherein the acrylate monomer is selected from the group consisting of methyl methacrylate, cyclohexyl methacrylate, benzyl methacrylate, trimethyl cyclohexyl methacrylate, isobornyl acrylate, isobornyl methacrylate, and combinations thereof.

49. A mailer type business form as recited in claim 46 wherein the acrylate monomer comprises methyl methacrylate.

50. A mailer type business form as recited in claim 46 wherein the acrylate monomer comprises methyl methacrylate at about 5–30% by weight of the natural rubber and wherein said 4-acetoxystyrene is about 0.5–10% by weight of the natural rubber.

51. A mailer type business form as recited in claim 50 wherein the methyl methacrylate is about 10–20% by weight of the natural rubber.

52. A mailer type business form as recited in claim 51 wherein the modified rubber latex is an electrosterically stabilized latex of natural rubber graft and block terpolymer.

53. A mailer type business form as recited in claim 46 further comprising about 1–

54. A mailer type business form as recited in claim 46 further comprising carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof at about 1–40% by weight of the natural rubber.

55. A mailer type business form on which pressure sensitive adhesive/cohesive is applied, said pressure sensitive adhesive/cohesive comprising:
a modified rubber latex synthesized by reacting 100 parts by weight natural rubber with at least one acrylate monomer and ethyl hexyl acrylate; and
a finely divided hard particulate material, having substantially no thermoplasticity, at about 1–50% by weight of the natural rubber;
wherein said at least one acrylate monomer is about 5–35% by weight of the natural rubber.

56. A mailer type business form as recited in claim 55 wherein the modified rubber latex is an electrosterically stabilized latex of natural rubber graft and block terpolymer.

57. A mailer type business form as recited in claim 55 wherein the acrylate monomer is selected from the group consisting of methyl methacrylate, cyclohexyl methacrylate, benzyl methacrylate, trimethyl cyclohexyl methacrylate, isobornyl acrylate, isobornyl methacrylate, and combinations thereof.

58. A mailer type business form as recited in claim 55 wherein the acrylate monomer comprises methyl methacrylate.

59. A mailer type business form as recited in claim 55 wherein the acrylate monomer comprises methyl methacrylate at about 5–30% by weight of the natural rubber and wherein said ethyl hexyl acrylate is at least 1% by weight of the natural rubber.

60. A mailer type business form as recited in claim 59 wherein the methyl methacrylate is about 10–20% by weight of the natural rubber and wherein said ethyl hexyl acrylate is about 1–20% by weight of the natural rubber.

61. A mailer type business form as recited in claim 60 wherein the modified rubber latex is an electrosterically stabilized latex of natural rubber graft and block terpolymer.

62. A mailer type business form as recited in claim 55 further comprising about 1–50% starch by weight of the natural rubber.

63. A mailer type business form as recited in claim 55 further comprising carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof at about 1–40% by weight of the natural rubber.

64. A pressure sensitive adhesive/cohesive comprising:
a modified rubber latex synthesized by reacting 100 parts by weight natural rubber with at least cyclohexane methacrylate and methyl methacrylate; and
a finely divided hard particulate material, having substantially no thermoplasticity, at about 1–50% by weight of the natural rubber;
wherein the cyclohexane methacrylate is about 2–6% by weight of the natural rubber and the methyl methacrylate is about 9–12% by weight of the natural rubber.

65. A pressure sensitive adhesive/cohesive as recited in claim 64 further comprising carboxylated styrene-butadiene latex, or carboxylated polychloroprene latex or vinyl-pyridine styrene-butadiene latex, or styrene-acrylate-acrylonitrile latex, or pre-crosslinked natural rubber latex, or a tackifier, or combinations thereof at about 1–40% by weight of the natural rubber, 66. A pressure sensitive adhesive/cohesive as recited in claim 64 wherein the modified rubber latex is an electrosterically stabilized latex of natural rubber graft and block terpolymer.

67. A pressure sensitive adhesive/cohesive as recited in claim 64 further comprising a built-in antioxidant in the modified rubber latex, which gives an oxidative stability to the pressure sensitive adhesive/cohesive.

68. A pressure sensitive adhesive/cohesive as recited in claim 64 further comprising starch which is at least 1% by weight of the natural rubber, and wherein the modified rubber latex is an electrosterically stabilized latex of natural rubber graft and block terpolymer.

69. A pressure sensitive adhesive/cohesive as recited in claim 64 further comprising starch having an average particle size of about 5–25 microns at about 10–30% by weight of the natural rubber.

70. A pressure sensitive adhesive/cohesive as recited in claim 64 wherein the hard particulate material comprises silica gel having an average particle size of about 0.1–20 microns at about 10–30% by weight of the natural rubber.

71. A pressure sensitive adhesive/cohesive as recited in claim 64 further comprising carboxylated styrene-butadiene latex, or carboxylated polychloroprene latex, or vinyl-pyridine styrene-butadiene latex, or pre-crosslinked natural rubber latex, or a styrene-acrylate-acrylonitrile latex, or a tackifier, or combinations thereof which is at least 5% by weight of the natural rubber.

72. A method of making a pressure sensitive adhesive/cohesive comprising:
   (a) placing natural rubber and cyclohexyl methacrylate (CHMA) at about 2–6% by weight of the natural rubber in a reaction vessel, wherein the reaction vessel contains a reaction mixture; and
   (b) initiating polymerization of CHMA, then adding methyl methacrylate (MMA) at about 9–12% by weight of the natural rubber to said reaction mixture, and continuing polymerization to create partial blocks of poly CHMA poly MMA grafted onto natural rubber (graft/block terpolymer latex).

73. The method of claim 72 further comprising blending carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof, at about 1–40% by weight of the natural rubber, with said graft/block terpolymer latex.

74. A pressure sensitive adhesive/cohesive made by the method of claim 72.

75. A pressure sensitive adhesive/cohesive made by the method of claim 73,

76. A method of making an electrosterically stabilized latex for use as a pressure sensitive adhesive/cohesive comprising polymerizing 100 parts by weight natural rubber with at least one acrylate monomer at about 5–35% by weight of the rubber and acrylic acid at about 0.5–8% by weight of the rubber and/or 4-acetoxystyrene at about 0-10% by weight of the rubber.

77. An electrosterically stabilized latex made by the method of claim 76.

* * * * *

UNITED STATES PATENT AND TRADEMARK OFFICE
CERTIFICATE OF CORRECTION

PATENT NO. : 6,602,944 B2
DATED : August 5, 2003
INVENTOR(S) : Vaidya

It is certified that error appears in the above-identified patent and that said Letters Patent is hereby corrected as shown below:

Column 15,
Line 43, delete and insert:
53. A mailer type business form as recited in claim 46 further comprising about [1-] 1-50% starch by weight of the natural rubber.

Column 16,
Line 40, delete and insert:
65. A pressure sensitive adhesive/cohesive as recited in claim 64 further comprising carboxylated styrene-butadiene latex, or carboxylated polychloroprene latex, or vinyl-pyridine styrene-butadiene latex, or styrene-acrylate-acrylonitrile latex, or pre-crosslinked natural rubber latex, or a tackifier, or combinations thereof at about 1-40% by weight of the natural rubber[,].

Signed and Sealed this

Fourth Day of November, 2003

JAMES E. ROGAN
*Director of the United States Patent and Trademark Office*